US011530617B2

(12) United States Patent
O'Neill et al.

(10) Patent No.: US 11,530,617 B2
(45) Date of Patent: Dec. 20, 2022

(54) GAS TURBINE PROPULSION SYSTEM

(71) Applicants: Francis O'Neill, Jupiter, FL (US); Anthony A. Hartzheim, Palm Beach Gardens, FL (US)

(72) Inventors: Francis O'Neill, Jupiter, FL (US); Anthony A. Hartzheim, Palm Beach Gardens, FL (US)

(73) Assignee: Antheon Research, Inc., Palm Beach Gardens, FL (US)

( * ) Notice: Subject to any disclaimer, the term of this patent is extended or adjusted under 35 U.S.C. 154(b) by 0 days.

(21) Appl. No.: 17/080,361

(22) Filed: Oct. 26, 2020

(65) Prior Publication Data

US 2022/0127969 A1 Apr. 28, 2022

(51) Int. Cl.
| | |
|---|---|
| *F02C 7/06* | (2006.01) |
| *B64D 27/10* | (2006.01) |
| *B64D 27/24* | (2006.01) |
| *F02K 3/06* | (2006.01) |
| *B64D 27/02* | (2006.01) |
| *F01D 15/10* | (2006.01) |
| *F02C 7/36* | (2006.01) |
| *F02C 7/268* | (2006.01) |
| *F02C 3/08* | (2006.01) |

(52) U.S. Cl.
CPC .............. *F01D 15/10* (2013.01); *B64D 27/10* (2013.01); *B64D 27/24* (2013.01); *F02C 7/06* (2013.01); *F02C 7/36* (2013.01); *F02K 3/06* (2013.01); *B64D 2027/026* (2013.01); *F02C 3/08* (2013.01); *F02C 7/268* (2013.01); *F05D 2220/323* (2013.01); *F05D 2220/76* (2013.01); *F05D 2240/511* (2013.01); *F05D 2240/53* (2013.01); *F05D 2240/54* (2013.01); *F05D 2260/85* (2013.01)

(58) Field of Classification Search
CPC .............. B64D 2027/026; B64D 27/24; B64D 27/10–20; F05D 2240/51–515; F05D 2240/53; F02K 1/66; F02K 3/072; F02K 3/06; F02C 6/206; F01D 15/10; H02K 7/1823; B60K 2006/266
See application file for complete search history.

(56) References Cited

U.S. PATENT DOCUMENTS

| | | | |
|---|---|---|---|
| 5,174,525 A | * | 12/1992 | Schilling .................. F02C 7/20 244/54 |
| 6,418,707 B1 | | 7/2002 | Paul |
| 6,962,057 B2 | | 11/2005 | Kurokawa et al. |

(Continued)

FOREIGN PATENT DOCUMENTS

CN 209398470 U 9/2019

*Primary Examiner* — Stephanie Sebasco Cheng
(74) *Attorney, Agent, or Firm* — Steve LeBlanc, LLC (57) ABSTRACT

A gas turbine propulsion system includes a shroud that defines a fluid flow path. A gas turbine engine in the fluid flow path includes a compressor, a combustor downstream from the compressor, and a turbine downstream from the combustor. An electric generator in the fluid flow path includes a rotor coaxially aligned with the turbine. A propulsor is upstream from the gas turbine engine, and an electric motor is operably coupled to the propulsor to rotate the propulsor. The propulsor is rotationally isolated from the gas turbine engine so that the propulsor rotates independently from operation of the gas turbine engine.

18 Claims, 10 Drawing Sheets

(56) References Cited

U.S. PATENT DOCUMENTS

| | | | |
|---|---|---|---|
| 7,555,893 B2* | 7/2009 | Okai | F02K 3/06 60/228 |
| 8,024,932 B1 | 9/2011 | Stewart | |
| 8,181,442 B2 | 5/2012 | Youssef | |
| 8,307,660 B2 | 11/2012 | Stewart et al. | |
| 8,616,005 B1 | 12/2013 | Cousino, Sr. | |
| 9,212,625 B2* | 12/2015 | Shelley | B64D 27/10 |
| 9,422,863 B2 | 8/2016 | Bedrine et al. | |
| 10,385,774 B2 | 8/2019 | Kupratis et al. | |
| 10,557,374 B2 | 2/2020 | Panzner et al. | |
| 10,822,100 B2* | 11/2020 | Dindar | B64D 27/20 |
| 10,914,195 B2* | 2/2021 | Mook | F01D 25/16 |
| 2010/0107651 A1* | 5/2010 | Hyde | F02C 6/00 60/39.23 |
| 2010/0154380 A1 | 6/2010 | Tangirala et al. | |
| 2014/0345281 A1* | 11/2014 | Galbraith | F02C 1/00 60/716 |
| 2015/0046061 A1 | 2/2015 | Copeland et al. | |
| 2016/0023773 A1* | 1/2016 | Himmelmann | B64D 27/10 903/903 |
| 2016/0177822 A1 | 6/2016 | Howes et al. | |
| 2016/0201508 A1* | 7/2016 | Klusman | F01D 25/166 415/229 |
| 2016/0215694 A1 | 7/2016 | Brostmeyer et al. | |
| 2017/0051672 A1 | 2/2017 | Nowakowski et al. | |
| 2017/0291712 A1* | 10/2017 | Himmelmann | B64D 27/10 |
| 2017/0298826 A1 | 10/2017 | Ryznic et al. | |
| 2017/0314509 A1 | 11/2017 | Laricchiuta et al. | |
| 2018/0066586 A1 | 3/2018 | Brostmeyer et al. | |
| 2018/0363554 A1 | 12/2018 | Kroger et al. | |
| 2019/0055852 A1 | 2/2019 | Wuestenberg | |
| 2019/0055991 A1 | 2/2019 | Wuestenberg | |
| 2019/0055999 A1 | 2/2019 | Wuestenberg | |
| 2019/0186360 A1 | 6/2019 | Sellers | |
| 2019/0322379 A1 | 10/2019 | Mackin | |
| 2019/0323426 A1 | 10/2019 | Mackin | |
| 2019/0323427 A1 | 10/2019 | Mackin | |
| 2020/0347789 A1* | 11/2020 | Ota | F04D 27/0292 |
| 2021/0087940 A1* | 3/2021 | Clark | F01D 5/141 |

* cited by examiner

GAS TURBINE PROPULSION SYSTEM

FIELD OF THE INVENTION

The present invention generally involves a gas turbine propulsion system. Particular embodiments of the propulsion system may be incorporated into an aircraft as a turboprop or turbofan engine.

BACKGROUND OF THE INVENTION

Conventional aircraft propulsion systems often include a gas turbine engine that produces thrust and mechanical power. The gas turbine engine includes a compressor, one or more combustors downstream from the compressor, and a turbine downstream from the combustor(s). Ambient air enters the compressor as a working fluid, and one or more stages of rotating blades and stationary vanes in the compressor progressively increase the pressure of the working fluid. The working fluid exits the compressor and flows to the combustors where it mixes with fuel and ignites to generate combustion gases having a high temperature, pressure, and velocity. The combustion gases flow to the turbine where they produce work by rotating the turbine before exhausting from the turbine to provide thrust. A spool or shaft connects the turbine to a propulsor, such as a propeller or a fan, so that rotation of the turbine drives the propulsor to generate additional thrust.

Figure 1:
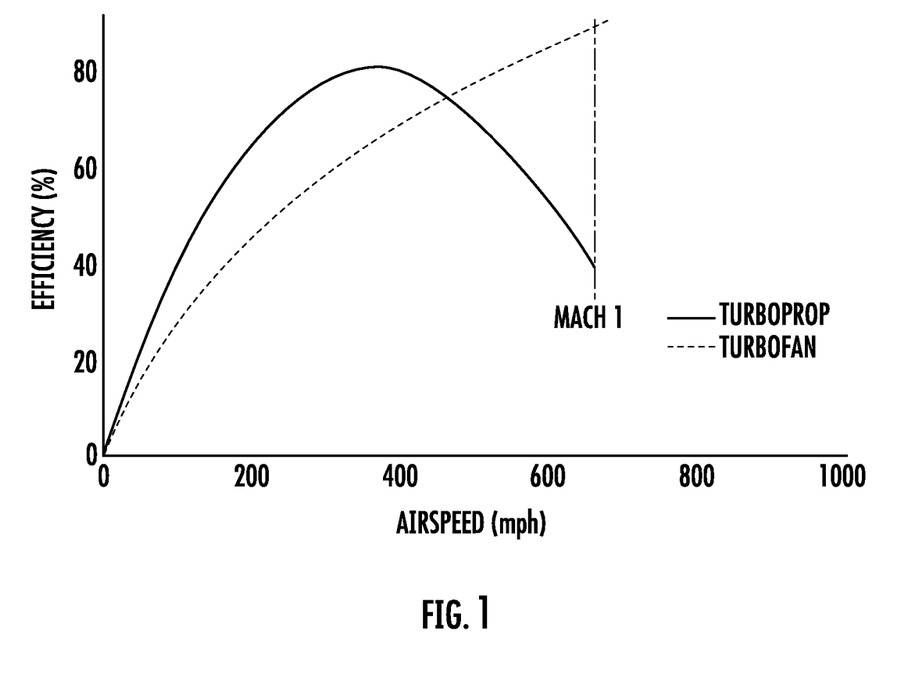
FIG. 1 is a graph of airspeed verses efficiency for turboprop and turbofan systems.

FIG. 1 provides a graph of airspeed verses efficiency for turboprop and turbofan systems incorporated into an aircraft. As used herein, a turboprop system uses a gas turbine engine to drive a propeller that is not surrounded by a shroud or cowling, and a turbofan system uses a gas turbine engine to drive a fan that is surrounded by a shroud or cowling. As shown in FIG. 1, a turboprop system is generally more efficient than a turbofan system at lower aircraft speeds, but the efficiency of a turboprop system drops off significantly above 400 mph as the aircraft speed approaches the speed of sound. In contrast, a turbofan system is generally more efficient than a turboprop system at higher aircraft speeds, and the efficiency of a turbofan system gradually increases above 400 mph and at aircraft speeds that exceed the speed of sound.

The efficiency of turboprop and turbofan systems naturally depends on the combined efficiency of the gas turbine engine and associated propulsor. Gas turbine engines are generally more efficient at higher operating speeds or power levels, while propellers and fans are generally more efficient at slower operating speeds or power levels. To enhance the combined efficiency, existing turboprop and turbofan systems may incorporate multiple shafts (spools), gears, and/or a transmission to allow the gas turbine to rotate at substantially higher speeds than the propulsor. However, the multiple shafts, gears, and/or transmissions add substantial weight to an aircraft design. In addition, multiple shafts, gears, and/or transmissions generally require additional support systems, such as lube oil systems, to provide lubrication and cooling, and these additional support systems increase the cost of assembly, maintenance, and repairs. Moreover, the mechanical linkage between the gas turbine engine and the propulsor necessarily limits whatever optimized efficiency is selected to a single operating speed or condition for the gas turbine and propulsor. Therefore, the need exists for an improved propulsion system that enhances the combined efficiency of both the gas turbine engine and the propulsor at multiple speeds and operating conditions.

BRIEF DESCRIPTION OF THE INVENTION

Aspects and advantages of the invention are set forth below in the following description, or may be obvious from the description, or may be learned through practice of the invention.

One embodiment of the present invention is a gas turbine propulsion system that includes a shroud that defines a fluid flow path. A gas turbine engine in the fluid flow path includes a compressor, a combustor downstream from the compressor, and a turbine downstream from the combustor. An electric generator in the fluid flow path includes a rotor coaxially aligned with the turbine. A propulsor is upstream from the gas turbine engine, and an electric motor is operably coupled to the propulsor to rotate the propulsor. The propulsor is rotationally isolated from the gas turbine engine so that the propulsor rotates independently from operation of the gas turbine engine.

An alternate embodiment of the present invention is a gas turbine propulsion system that includes a gas turbine engine having a compressor, a combustor downstream from the compressor, and a turbine downstream from the combustor. An electric generator is operably connected to the gas turbine engine and includes a rotor coaxially aligned with the turbine. A propulsor is upstream from the electric generator, and an electric motor is operably coupled to the propulsor to rotate the propulsor. The propulsor rotates independently from operation of the gas turbine engine.

In yet another embodiment of the present invention, a gas turbine propulsion system includes a shroud that defines a fluid flow path. A gas turbine engine in the fluid flow path includes a compressor, a combustor downstream from the compressor, and a turbine downstream from the combustor. A propulsor is upstream from the gas turbine engine, and an electric motor is operably coupled to the propulsor to rotate the propulsor. The electric motor and the propulsor are rotationally isolated from the gas turbine engine so that the propulsor rotates independently from operation of the gas turbine engine.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. As used herein, the terms "upstream" and "downstream" refer to the location of items with reference to the direction of fluid flow in a fluid pathway. For example, item A is "upstream" from item B and item B is downstream from item A if fluid normally flows from item A to item B. As used herein, "axial" refers to the direction of the longer axis of a component, "radial" refers to the direction perpendicular to the axial direction, and "circumferential" refers to the direction around a component.

Embodiments of the present invention include a gas turbine propulsion system that may be incorporated into any vehicle needing propulsion. For example, the gas turbine propulsion system may be housed in a nacelle and attached to the fuselage or wing of an aircraft. The gas turbine propulsion system generally includes a gas turbine engine and a propulsor. The gas turbine engine generally includes a compressor, a combustor, and a turbine, and the propulsor may be a propeller or a fan enclosed by a shroud or cowling. The propulsor is rotationally isolated from the gas turbine engine so that rotation of the propulsor is completely independent from the gas turbine engine. As used herein, the phrase "rotationally isolated" means that no mechanical coupling exists between two components to transfer rotation between the two components, in this case, the gas turbine engine and the propulsor. As a result, rotation of the propulsor is completely independent from operation of the gas turbine engine, allowing each to operate at its most efficient speed independently from the other.

Particular embodiments of the present invention may include additional design features to reduce the weight, manufacturing cost, and/or maintenance associated with the gas turbine engine. For example, the gas turbine engine may be a single-spool gas turbine engine. As used herein, a "single-spool gas turbine engine" means a gas turbine engine in which a single spool or shaft, which may include multiple segments, connects the turbine to the compressor so that the turbine and compressor rotate at the same speed. The single spool or shaft may also connect the gas turbine engine to an electric generator so that the turbine and electric generator rotate at the same speed. The use of a single spool or shaft reduces the weight and parts associated with the gas turbine engine, simplifying manufacture, maintenance, and repairs compared to multi-spool and/or geared systems. In addition, the reduced weight associated with a single-spool gas turbine engine reduces the need for a separate lube oil system to lubricate and cool the rotating components of the gas turbine engine. As a result, in particular embodiments the gas turbine engine may include non-lubricated bearings and/or an integrally bladed rotor that further reduce manufacturing, maintenance, and repair costs. As used herein, "non-lubricated bearings" means that the bearings are not supplied external lubrication, such as from a lube oil system, during operation of the gas turbine engine.

Figure 2:
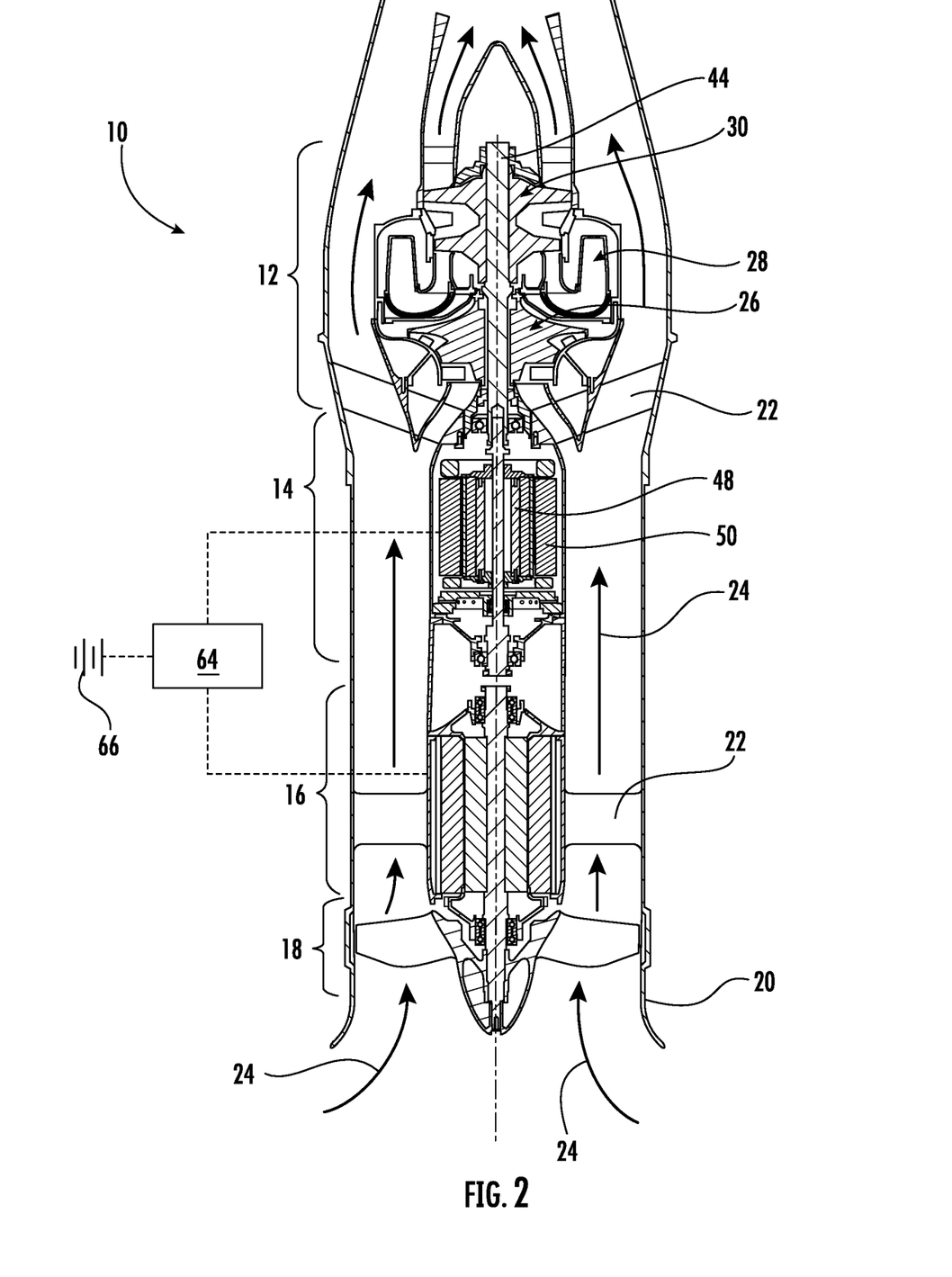
FIG. 2 is side cross-section view of a gas turbine propulsion system according to one embodiment of the present invention.

FIG. 2 provides a side cross-section view of a gas turbine propulsion system 10 according to one embodiment of the present invention. In the particular embodiment shown in FIG. 2, the gas turbine propulsion system 10 includes a gas turbine engine 12, an electric generator 14, an electric motor 16, and a propulsor 18. As will be described in more detail, the electric motor 16 and propulsor 18 are rotationally isolated from the gas turbine engine 12 so that the propulsor 18 may rotate independently from operation of the gas turbine engine 12 at all times. A shroud 20 supported by struts 22 may surround the gas turbine engine 12 and propulsor 18 to define a fluid flow path 24 from the propulsor 18 to the gas turbine engine 12. If present, the shroud 20 focuses the airflow produced by the propulsor 18 that enters the gas turbine engine 12, as well as the airflow that bypasses the gas turbine engine 12 and exits the shroud 20 as thrust.

Figure 3:
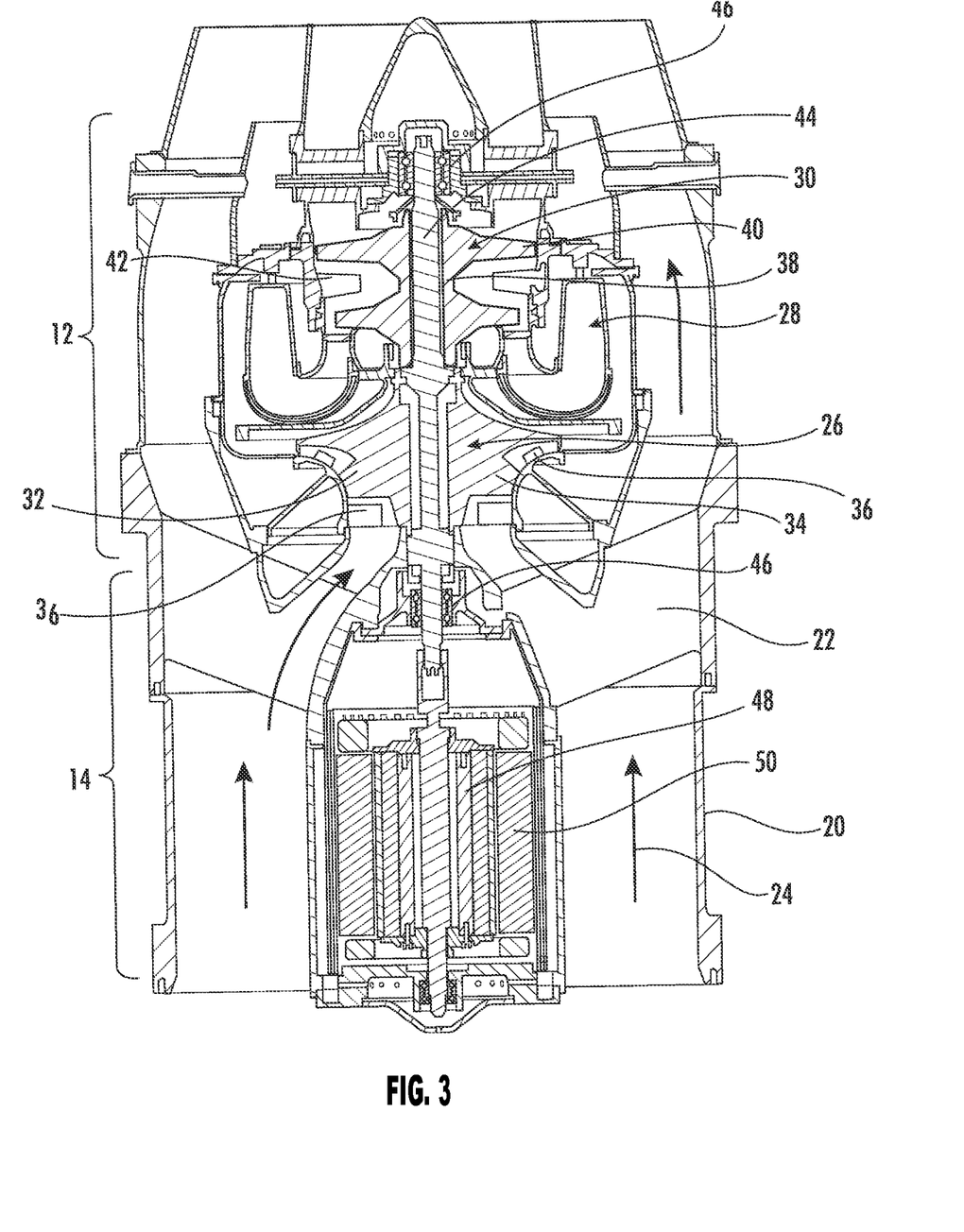
FIG. 3 is an enlarged side cross-section view of the gas turbine engine and electric generator shown in FIG. 2.

FIG. 3 provides an enlarged side cross-section view of the gas turbine engine 12 and electric generator 14 shown in FIG. 2. In the particular embodiment shown in FIGS. 2 and 3, the gas turbine engine 12 is located in the fluid flow path 24 downstream from the propulsor 18. The gas turbine engine 12 generally includes a compressor 26, combustors 28 downstream from the compressor 26, and a turbine 30 downstream from the combustors 28, as is known in the art. The compressor 26 includes a rotor 32 with one or more alternating stages of rotating blades 34 and fixed vanes 36 that progressively increase the pressure of the working fluid entering the compressor 26. The combustors 28 mix the compressed working fluid with fuel and ignite the mixture to generate combustion gases having a high temperature, pressure, and velocity. The turbine 30 includes a rotor 38 with one or more alternating stages of rotating blades 40 and fixed vanes 42 to extract work from the combustion gases exiting the combustors 28. In the particular embodiment shown in FIGS. 2 and 3, the compressor 26 is a single stage, axial-flow compressor, and the turbine 30 is a two-stage axial-flow turbine. However, unless specifically recited in the claims, the gas turbine engine 12 included in the present invention is not limited to any particular design or size and may include a multi-stage axial or radial-flow compressor 26, one or more combustors 28, and an axial or radial-flow turbine 30 with one or more stages.

Gas turbine engines are generally more efficient at higher turbine inlet temperatures which may damage the rotating blades in the turbine. As a result, the rotating blades are often hollow so that cooling may be supplied through the rotor to the hollow rotating blades to prevent damage from the higher turbine inlet temperatures. In the present invention, the rotational isolation between the gas turbine engine 12 and the propulsor 18 allows the gas turbine engine 12 to operate at lower turbine inlet temperatures than what may otherwise be preferred to achieve a desired efficiency for the gas turbine engine 12. The lower turbine inlet temperatures in turn reduce the need for internal cooling to the rotating blades 40 in the turbine 30. As a result, in particular embodiments of the present invention, the rotor 38 in the turbine 30 may be an integrally bladed rotor 38 or "blisk" in which the rotating blades 40 are solid and integrally formed as a solid piece with the rotor 38. The integrally bladed rotor 38 may be manufactured by additive printing, casting, machining from a solid piece of material, or welding individual blades 40 to the rotor 38, as is known in the art. The resulting integrally bladed rotor 38 reduces the complexity, weight, and cost of manufacturing and assembly by avoiding the intricacy of hollow blades, dovetail connections to the rotor, and forced cooling through the rotor and blades.

The gas turbine engine 12 may include one or more spools or shafts that rotationally couple the turbine 30 to the compressor 26, as is known in the art. In a multi-spool gas turbine engine, for example, the compressor and the turbine may each include a high pressure stage and a low pressure stage, and a first spool may connect the high pressure stage of the turbine to the high pressure stage of the compressor, while a second spool may connect the low pressure stage of the turbine to the low pressure stage of the compressor. In this manner, each turbine stage drives the corresponding compressor stage with a separate spool, with one spool inside the other spool.

In the particular embodiment shown in FIGS. 2 and 3, the gas turbine engine 12 is a single-spool gas turbine engine 12 in which a single spool or shaft 44 connects the turbine 30 to the compressor 26. The single spool or shaft 44 may include multiple segments connected together to rotate in unison and transmit rotation of the turbine rotor 38 directly to the compressor rotor 32 without the use of gears.

The single-spool gas turbine engine 12 shown in FIGS. 2 and 3 is lighter and generates less heat compared to a similarly-sized gas turbine engine with multiple spools or shafts and/or gears. As a result, bearings that support the rotating components of the gas turbine engine 12 do not require an external source of lube oil to lubricate and cool the bearings, and particular embodiments of the present invention may include non-lubricated bearings 46 that rotatably support the shaft 44 or single-spool gas turbine engine 12. As shown most clearly in FIG. 3, for example, the non-lubricated bearings 46 may support the single spool or shaft 44 at various positions in the gas turbine engine 12 and/or electric generator 14. The non-lubricated bearings 46 may include, for example, air-lubricated bearings or ceramic bearings encapsulated in a casing that allows periodic addition of lubrication to the bearings without the ability to permit lube oil flow through the bearings during operation. The non-lubricated bearings 46 thus further reduce the weight, manufacturing cost, maintenance cost, and complexity of the gas turbine engine 12 by obviating the need for a separate lube oil system and associated pumps, sumps, and filters.

Figure 4:
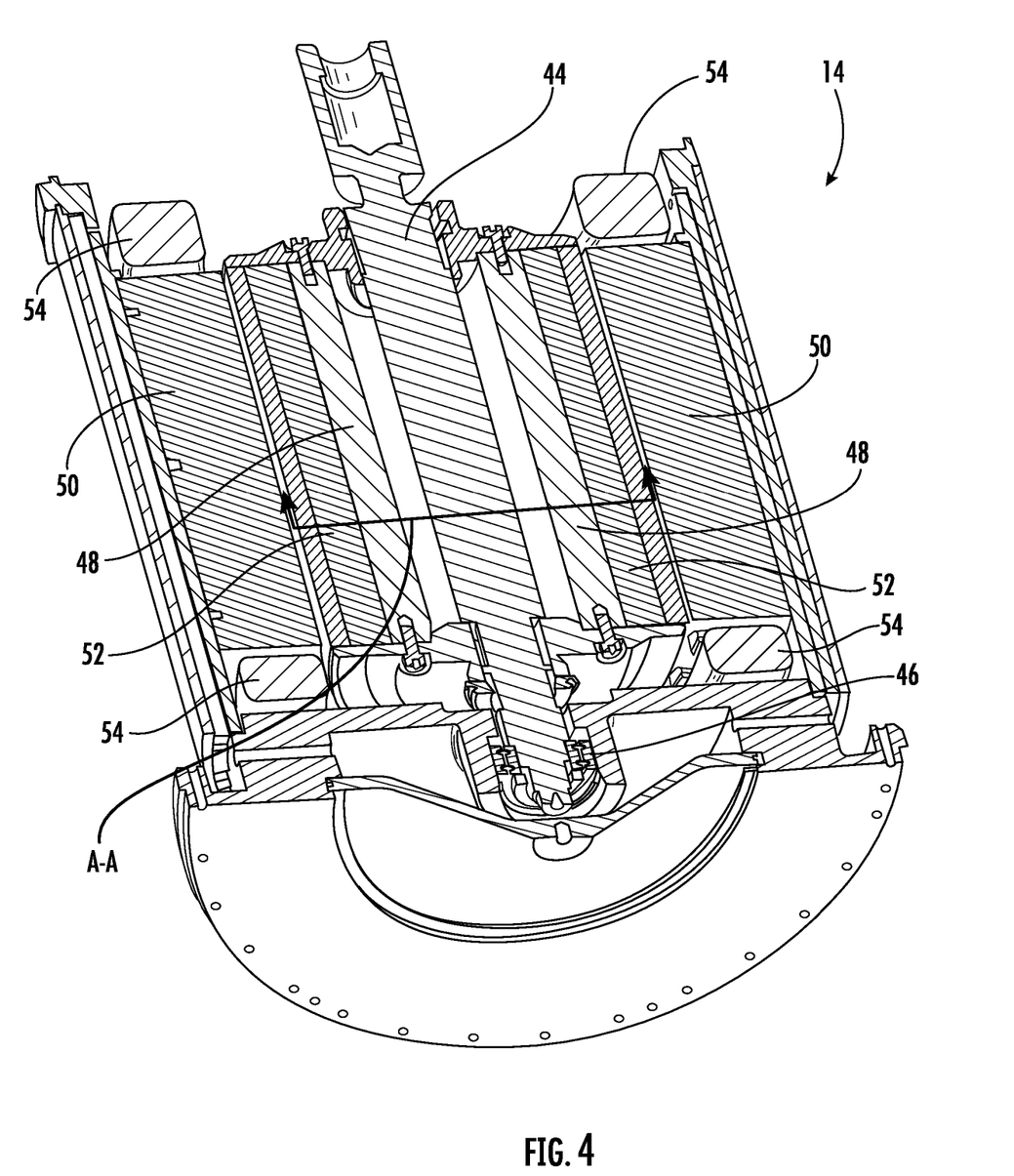
FIG. 4 is an enlarged front perspective cross-section view of the electric generator shown in FIG. 2.

FIG. 4 provides an enlarged front perspective cross-section view of the electric generator 14 shown in FIGS. 2 and 3. The electric generator 14 generally includes a rotor 48 and a stator 50, and relative movement between the rotor 48 and the stator 50 disrupts a magnetic field between the two to convert mechanical energy into electrical energy, as is known in the art. In the particular embodiment shown in FIGS. 3 and 4, the rotor 48 includes permanent magnets 52 that create the magnetic field, and the stator 50 includes conductive windings 54 so that relative movement between the permanent magnets 52 on the rotor 48 and the conductive windings 54 on the stator 50 disrupts the magnetic field and induces current flow in the conductive windings 54. One of ordinary skill in the art will readily appreciate that the magnetic field may be created by a current applied to the rotor 48 instead of permanent magnets, or the stator 50 may generate the magnetic field, and the rotor 48 may include the conductive windings 54, and the present invention is not limited to the particular configuration of the electric generator 14 unless specifically recited in the claims.

The electric generator 14 may be located outside of the shroud 20 or remote from the fluid flow path 24, and the present invention is not limited to a particular location for the electric generator 14 unless specifically recited in the claims. In the particular embodiment shown in FIGS. 2-4, the electric generator 14 is located in the fluid flow path 24 upstream from the gas turbine engine 12 and downstream from the propulsor 18. In addition, the rotor 48 of the electric generator 14 is coaxially aligned with the compressor 26, the turbine 30, and the turbine rotor 38 to avoid the need for gears or universal joints that would otherwise be needed to transfer rotational work from the gas turbine engine 12 to the electric generator 14.

The use of a gas turbine engine to drive an electric generator is known in the art. For example, U.S. Pat. No. 6,962,057 describes a micro gas turbine in which a single-spool gas turbine engine drives a coaxially aligned electric generator to produce 20-100 kW of power. The power output of the electric generator may be increased by increasing the strength of the magnetic field, e.g., by incorporating larger permanent magnets on the rotor. However, the additional mass associated with larger permanent magnets produces larger centrifugal forces that tend to separate the permanent magnets from the rotor, particularly at the high rotational speeds associated with a single-spool gas turbine engine that directly drives the electric generator. Therefore, gas turbine engines that drive higher power output generators generally require multiple spools or shafts, gears, and/or transmissions that allow the electric generator to rotate at substantially lower speeds than the turbine in the gas turbine engine to prevent the centrifugal forces from separating the permanent magnets from the rotor.

In the particular embodiment shown in FIGS. 2-4, the single spool or shaft 44 connects the turbine rotor 38 to the rotor 48 of the electric generator 14 so that the turbine rotor 38 and the generator rotor 48 rotate at the same speed. Although the output power of the electric generator 14 is not a limitation of the present invention unless recited in the claims, in particular embodiments, the electric generator 14 may produce an output of greater than 1 MW, 1.5 MW, or 2 MW. Inasmuch as the turbine rotor 38 may rotate at 20,000 rpm or more, the incorporation of larger permanent magnets 52 on the rotor 48 to produce output power greater than 1 MW requires additional structure to hold the permanent magnets 52 in place. Therefore, the electric generator 14 may further include means for holding the permanent magnets 52 in place on the rotor 48 during operation of the gas turbine engine 12, the turbine 30, and/or the turbine rotor 38.

The function of the means for holding the permanent magnets 52 in place on the rotor 48 during operation of the gas turbine engine 12, the turbine 30, and/or the turbine rotor 38 is to prevent movement between the rotor 48 and the permanent magnets 52 during operations. The structure for performing this function may be any mechanical coupling with the permanent magnets 52 that prevents the permanent magnets 52 from moving with respect to the rotor 48. For example, the mechanical coupling may be one or more clamps, bolts, screws, or dovetail fittings that mechanically couple some or all of the permanent magnets 52 to the rotor 48. Alternately, the mechanical coupling may be a series of rails or other projections that extend radially from the rotor 48 combined with an overwrap that circumferentially surrounds the permanent magnets 52. The rails or other projections engage with some or all of the permanent magnets 52 to transfer torque between the rotor 48 and the permanent magnets 52 and prevent the permanent magnets 52 from moving circumferentially with respect to the rotor 48. In particular embodiments, the rails or other projections may be contoured, ribbed, tapered, or flanged to match a complementary recess in the permanent magnets 52. The overwrap that circumferentially surrounds the permanent magnets 52 provides sufficient centripetal force against the permanent magnets 52 to offset the centrifugal forces caused by rotation of the rotor 48 to prevent the permanent magnets 52 from moving radially away from the rotor 48. The overwrap may be a fiber or composite material sprayed or wrapped around the outer circumference of the permanent magnets 52. In combination, the rails or projections and overwrap thus securely hold the permanent magnets 52 in contact with the rotor 48 to prevent circumferential and radial movement between the rotor 48 and the permanent magnets 52 during operations.

Figure 5:
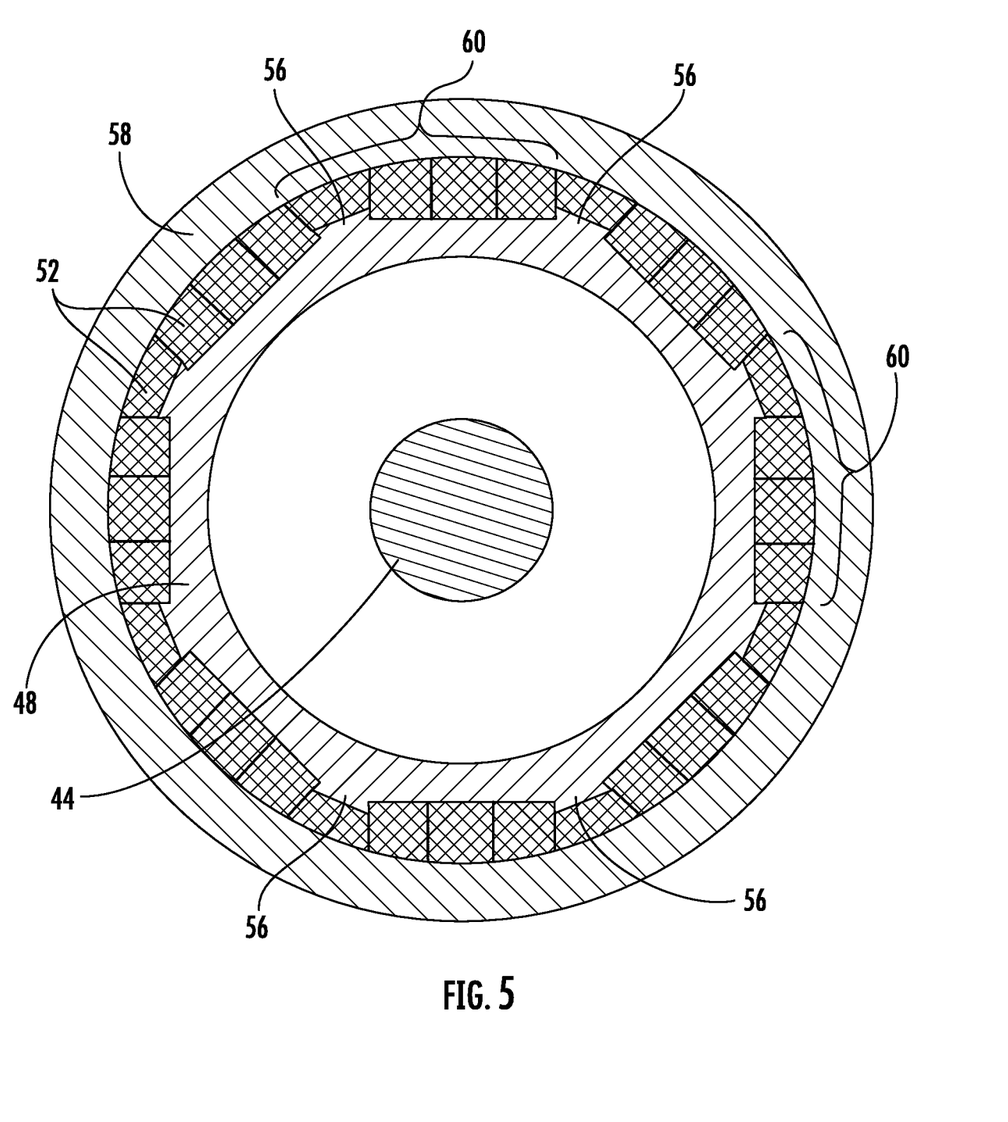
FIG. 5 is an axial cross-section view of the rotor of the electric generator taken along line A-A of FIG. 4 according to one embodiment of the present invention.

FIG. 5 provides an axial cross-section view of the rotor 48 of the electric generator 14 taken along line A-A of FIG. 4 according to one embodiment of the present invention. In this particular embodiment, the permanent magnets 52 are arranged circumferentially around the rotor 48 and extend longitudinally along the rotor 48 to create the magnetic field. The means for holding the permanent magnets 52 in place on the rotor 48 during operation of the gas turbine engine 12, the turbine 30, and/or the turbine rotor 38 includes multiple rails 56 and an overwrap 58. The multiple rails 56 extend radially from the rotor 48 and may extend longitudinally along some or all of the rotor 48. As shown in FIG. 5, the permanent magnets 52 are arranged in repeating groups 60 of four magnets 52, and the outer surface of the rotor 48 in contact with the permanent magnets 52 is substantially flat. Three permanent magnets 52 in each group 60 are sandwiched between or engaged with adjacent rails 56, and one permanent magnet 52 in each group 60 has a shorter radial dimension and is on top of a rail 56. In this manner, the rails 56 provide the mechanical coupling between the rotor 48 and the permanent magnets 52 to transfer torque between the rotor 48 and the permanent magnets 52 and prevent the permanent magnets 52 from moving circumferentially with respect to the rotor 48. The overwrap 58 circumferentially surrounds the permanent magnets 52 to provide sufficient centripetal force against the permanent magnets 52 to offset the centrifugal forces caused by rotation of the rotor 48 to prevent the permanent magnets 52 from moving radially away from the rotor 48. The rails 56 and overwrap 58 thus combine to provide the structure for holding the permanent magnets 52 in place on the rotor 48 during operation of the gas turbine engine 12, the turbine 30, and/or the turbine rotor 38.

Figure 6:
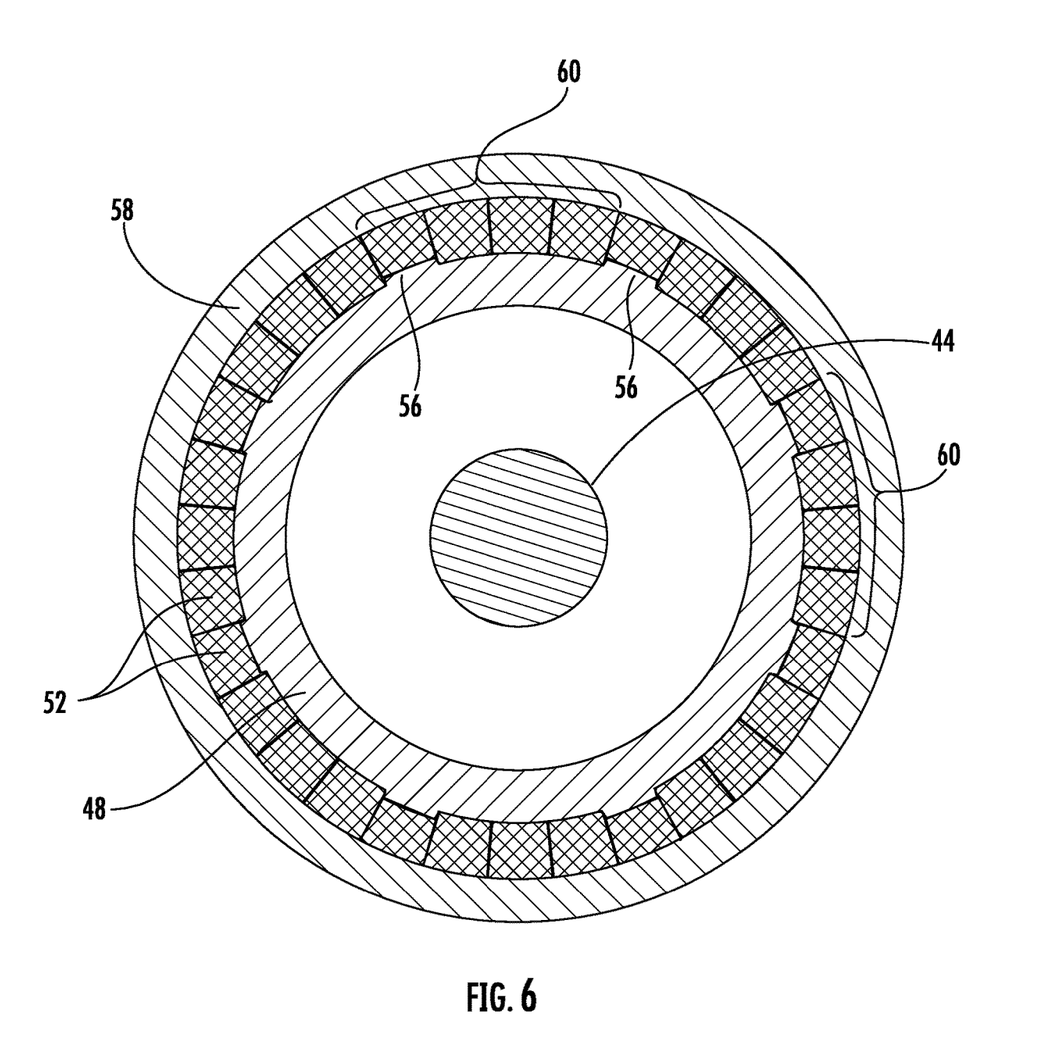
FIG. 6 is an axial cross-section view of the rotor of the electric generator taken along line A-A of FIG. 4 according to an alternate embodiment of the present invention.

FIG. 6 provides an axial cross-section view of the rotor 48 of the electric generator 14 taken along line A-A of FIG. 4 according to an alternate embodiment of the present invention. As shown in FIG. 6, the permanent magnets 52 are again arranged circumferentially around the rotor 48 and extend longitudinally along the rotor 48 to create the magnetic field, and the means for holding the permanent magnets 52 in place on the rotor 48 during operation of the gas turbine engine 12, the turbine 30, and/or the turbine rotor 38 again includes multiple rails 56 and an overwrap 58 as described with respect to FIG. 5. The permanent magnets 52 are again arranged in eight repeating groups 60 of four magnets 52. In this particular embodiment, however, the outer surface of the rotor 48 in contact with the permanent magnets 52 is curved, with the magnitude of the curve based on the radius of the rotor 48. As a result, this particular embodiment only requires fabrication of two different magnet sizes. Specifically, the three permanent magnets 52 in each group 60 that are sandwiched between or engaged with adjacent rails 56 are identical to one another, and the permanent magnet 52 in each group 60 on top of a rail 56 differs only in its radial dimension. The use of substantially identical permanent magnets 52 simplifies construction by reducing the manufacturing and maintenance costs associated with the permanent magnets 52.

Figure 7:
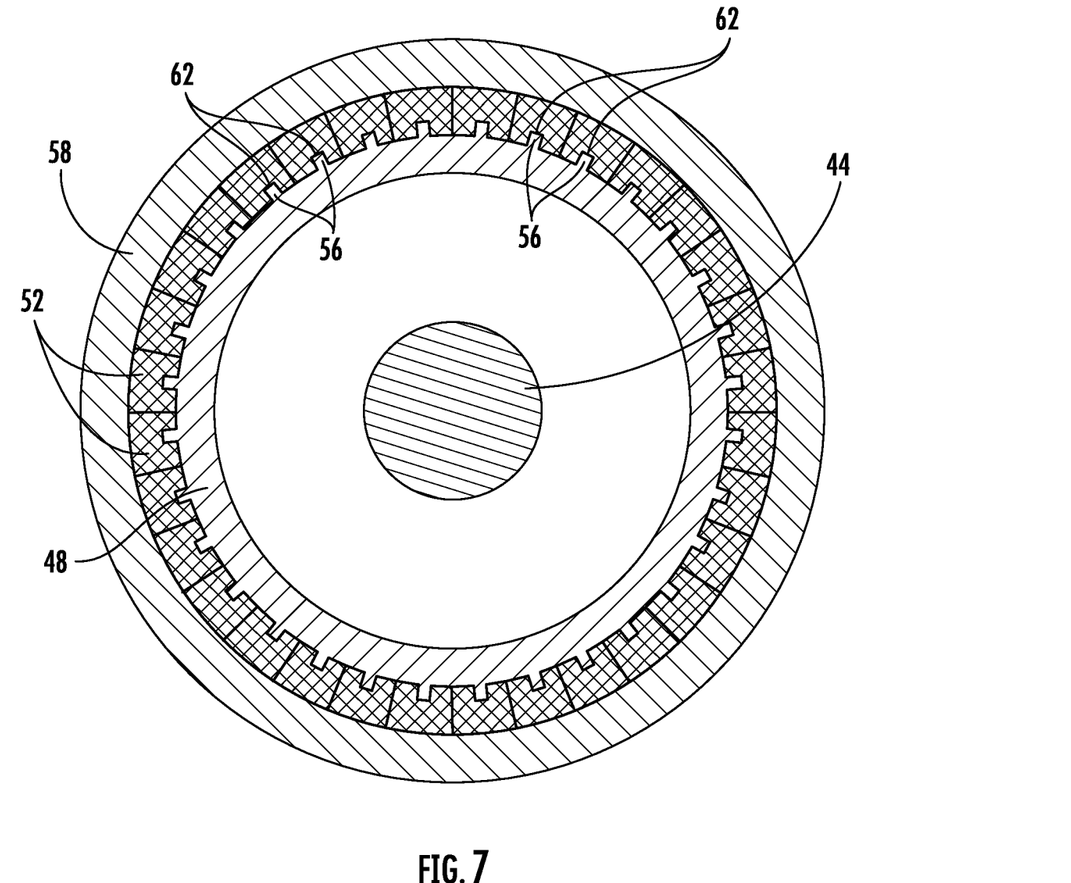
FIG. 7 is an axial cross-section view of the rotor of the electric generator taken along line A-A of FIG. 4 according to an alternate embodiment of the present invention.

FIG. 7 provides an axial cross-section view of the rotor 48 of the electric generator 14 taken along line A-A of FIG. 4 according to an alternate embodiment of the present invention. As shown in FIG. 7, the permanent magnets 52 are again arranged circumferentially around the rotor 48 and extend longitudinally along the rotor 48 to create the magnetic field, and the means for holding the permanent magnets 52 in place on the rotor 48 during operation of the gas turbine engine 12, the turbine 30, and/or the turbine rotor 38 again includes multiple rails 56 and an overwrap 58 as described with respect to FIG. 5. In this particular embodiment, the means further includes a recess 62 in some or all of the permanent magnets 52. Each recess 62 may have a shape that is complementary to the shape of the rails 56 to allow each rail 56 to extend into a recess 62 of a different permanent magnet 52. The mechanical coupling between the rails 56 and recesses 62 prevents the permanent magnets 52 from moving circumferentially with respect to the rotor 48, and the overwrap 58 prevents the permanent magnets 52 from moving radially away from the rotor 48. The rails 56, recesses 62, and overwrap 58 thus combine to provide the structure for holding the permanent magnets 52 in place on the rotor 48 during operation of the gas turbine engine 12, the turbine 30, and/or the turbine rotor 38.

Figure 8:
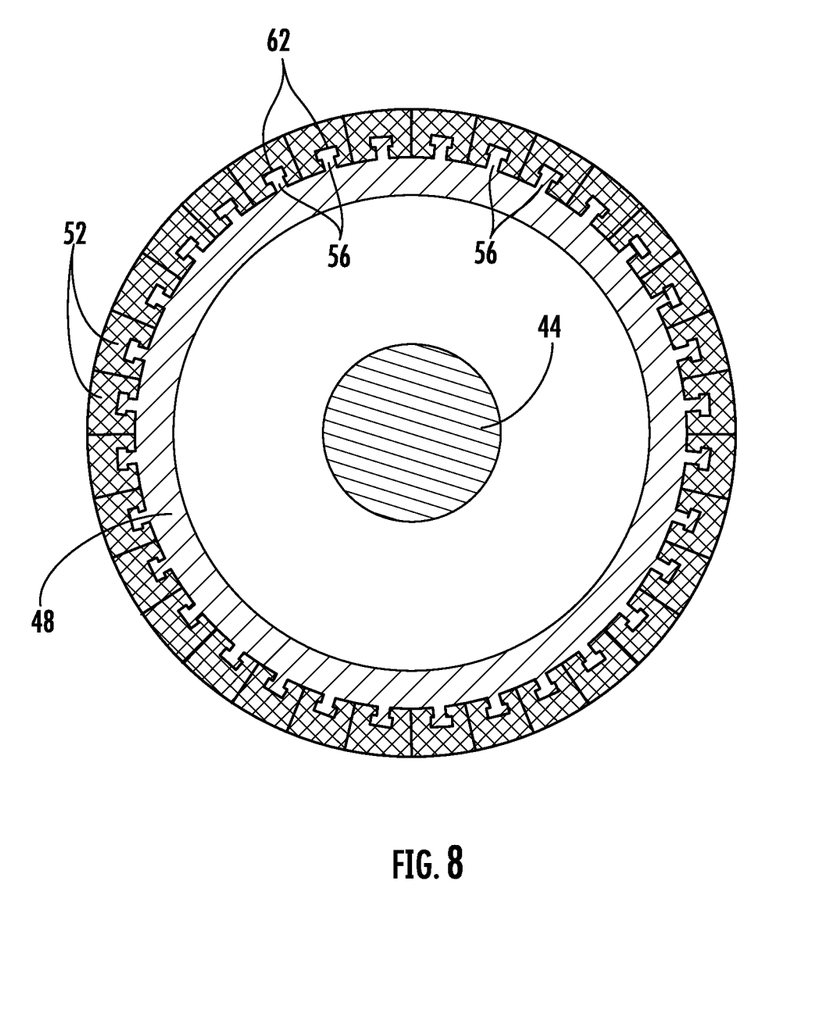
FIG. 8 is an axial cross-section view of the rotor of the electric generator taken along line A-A of FIG. 4 according to an alternate embodiment of the present invention.

FIG. 8 provides an axial cross-section view of the rotor 48 of the electric generator 14 taken along line A-A of FIG. 4 according to an alternate embodiment of the present invention. As shown in FIG. 8, the means for holding the permanent magnets 52 in place on the rotor 48 during operation of the gas turbine engine 12, the turbine 30, and/or the turbine rotor 38 again includes multiple rails 56 and recesses 62 in the permanent magnets 52. In this particular embodiment, the rails 56 are T-shaped, and the recesses 62 in the permanent magnets 52 have a complementary shape to receive the T-shaped rails 56. The rails 56 and recesses 62 thus provide the mechanical coupling that prevents the permanent magnets 52 from moving both circumferentially and radially with respect to the rotor 48, and an overwrap is not needed in this embodiment to perform the function of holding the permanent magnets 52 in place on the rotor 48 during operation of the gas turbine engine 12, the turbine 30, and/or the turbine rotor 38. One of ordinary skill in the art will readily appreciate that other shapes for the rails 56 and recesses 62 would similarly perform the function of holding the permanent magnets 52 in place on the rotor 48 during operation of the gas turbine engine 12, the turbine 30, and/or the turbine rotor 38 without the need for an overwrap. For example, alternate embodiments of the present invention may include rails 56 and recesses 62 having a fir tree shape, an L-shape, a dovetail shape, etc., and the present invention is not limited to any particular shape for the rails 56 and recesses 62 unless specifically recited in the claims.

The embodiments shown in FIGS. 5-8 thus allow larger and heavier permanent magnets 52 to be incorporated into the electric generator 14 to increase the output power of the electric generator 14. For example, embodiments in which the single spool or shaft 44 rotates the rotor 48 of the electric generator 14 at the same speed as the turbine rotor 38 may generate an output of more than 1 MW, 1.5 MW, or even 2 MW, depending on the radius of the rotor 48 and the size of the permanent magnets 52. This substantial output power may be used for any purpose, such as providing a portable power supply to remote geographic areas or following weather-related catastrophes.

Alternately, as in FIG. 2, the electric generator 14 may be incorporated into the gas turbine propulsion system 10 to provide electric power to drive the electric motor 16 of the propulsor 18. As shown by the dashed lines of FIG. 1, the output from the electric generator 14 may be routed to an electric bus 64. In this manner, the electric bus 64 may supply electric power to the electric motor 16 to drive the propulsor 18 or to a storage device, such as a battery 66, for subsequent use by the electric motor 16 to drive the propulsor 18 when the gas turbine engine 12 is not operating.

Figure 9:
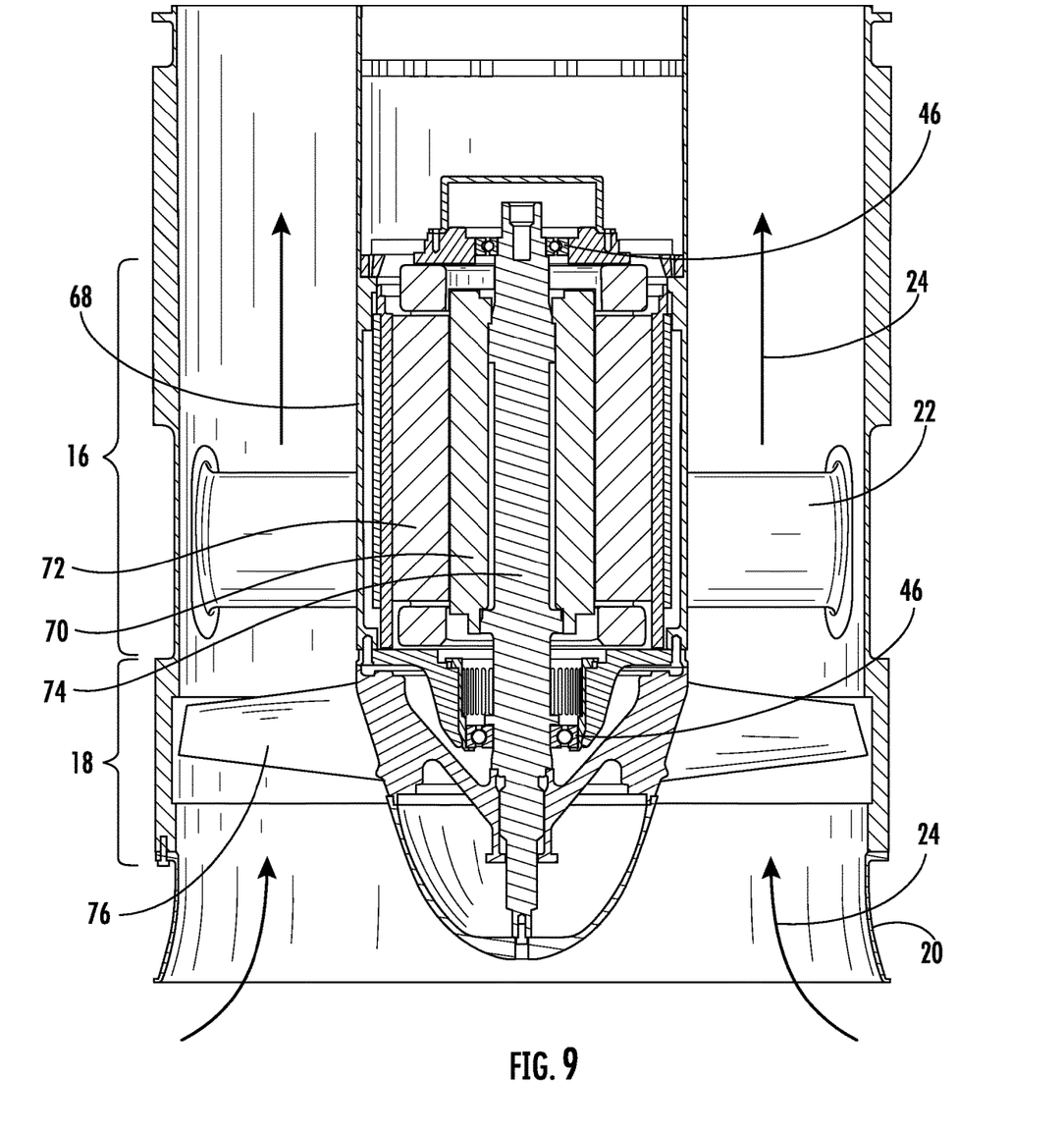
FIG. 9 is an enlarged side cross-section view of the electric motor and propulsor shown in FIG. 2.
Figure 10:
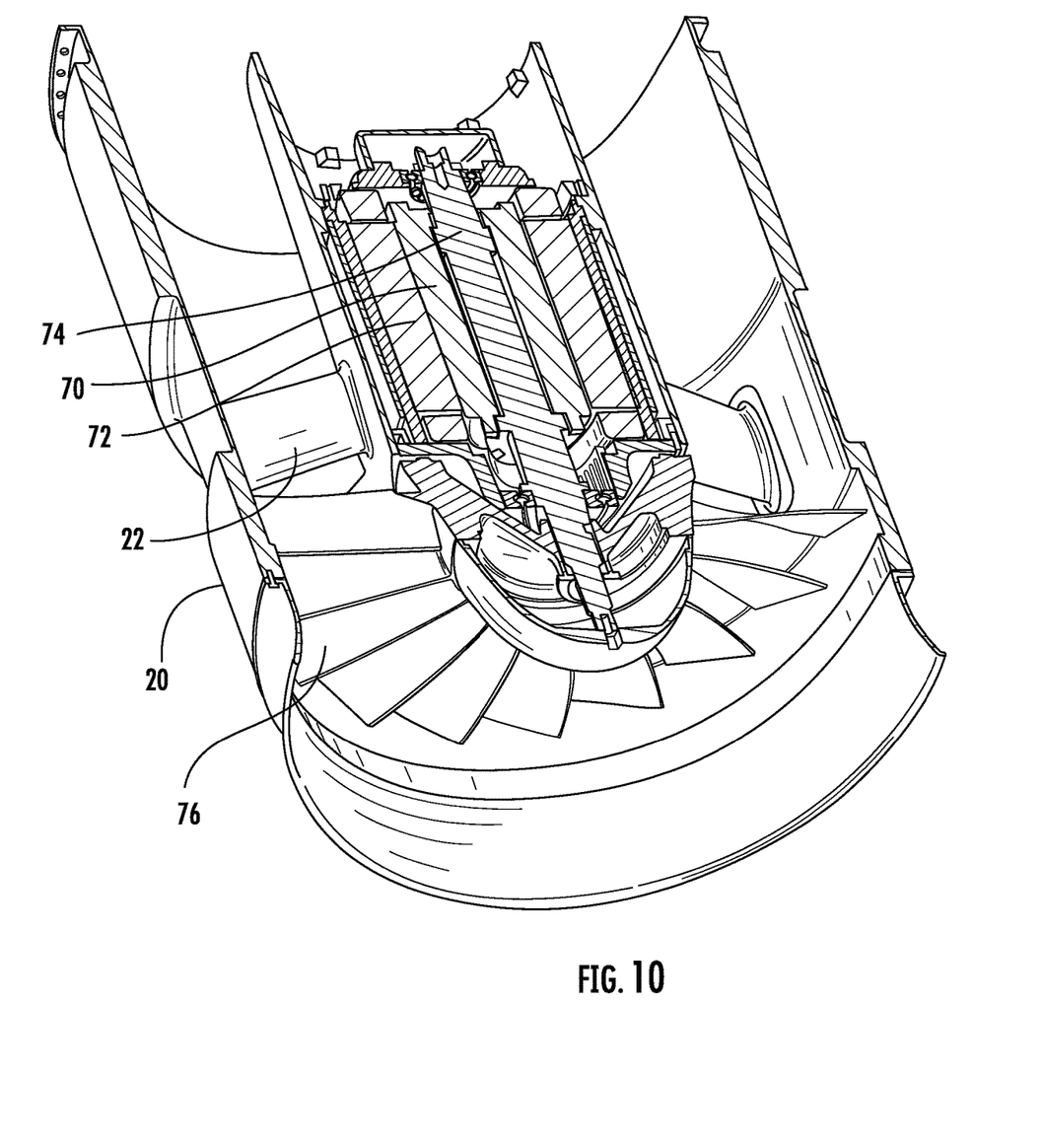
FIG. 10 is an enlarged front perspective cross-section view of the electric motor and propulsor shown in FIG. 2.

FIGS. 9 and 10 provide enlarged side and perspective cross-section views of the electric motor 16 and propulsor 18 shown in FIG. 2. As shown in FIG. 2, a casing 68 may surround the electric generator 14 and electric motor 16 to minimize disruption in the fluid flow path 24 between the electric generator 14 and electric motor 16. However, the electric motor 16 and propulsor 18 are rotationally isolated from the gas turbine engine 12 so that the propulsor 18 rotates independently from the gas turbine engine 12 at all times.

The electric motor 16 provides the sole driving force for the propulsor 18. The electric motor 16 generally includes a rotor 70 and a stator 72, and current flow disrupts a magnetic field between the two to convert electrical energy into mechanical energy, as is known in the art. In the particular embodiment shown in FIGS. 9 and 10, the rotor 70 provides the magnetic field, and the stator 72 includes conductive windings so that current flow through the stator 72 disrupts the magnetic field and induces rotational movement in the rotor 70. One of ordinary skill in the art will readily appreciate that the stator 72 may generate the magnetic field, and the rotor 70 may include the conductive windings, and the present invention is not limited to the particular configuration of the electric motor 16 unless specifically recited in the claims.

The electric motor 16 may be located outside of the shroud 20 or remote from the fluid flow path 24, and the present invention is not limited to a particular location for the electric motor 16 unless specifically recited in the claims. In the particular embodiment shown in FIGS. 2, 9, and 10, the electric motor 16 is located in the fluid flow path 24 upstream from the gas turbine engine 12 and downstream from the propulsor 18. A shaft 74 couples the rotor 70 to the propulsor 18, and the rotor 70 is coaxially aligned with the propulsor 18 to avoid the need for gears or universal joints that would otherwise be needed to transfer rotational work from the electric motor 16 to the propulsor 18.

The propulsor 18 may be a propeller that rotates outside of the shroud 20 or a fan enclosed by the shroud 20 or cowling. In either event, the propulsor 18 may be either axially offset from or coaxially aligned with the gas turbine engine 12 and/or electric motor 16, depending on the particular design. In the particular embodiment shown in FIGS. 2, 9, and 10, the propulsor 18 is a fan 76 surrounded by the shroud 20 or cowling and coaxially aligned with the electric motor 16 and gas turbine engine 12. Rotation of the fan 76 increases the pressure and velocity of air in the fluid flow path 24. As a result, air from the fluid flow path 24 entering the compressor 26 is supercharged, increasing the efficiency of the gas turbine engine 12. In particular embodiments, the increased efficiency on the gas turbine engine 12 may allow for a reduction in the turbine inlet temperature of approximately 150 degrees Fahrenheit or produce an increase of approximately 200 kW for the same turbine inlet temperature.

Referring again to FIG. 2, the rotational isolation between the gas turbine engine 12 and the propulsor 18 allows the gas turbine propulsion system 10 to operate in multiple modes, depending on the particular operational needs. For example, the efficiency of the gas turbine propulsion system 10 may be optimized by operating the gas turbine engine 12 at its most efficient power level and varying the power level or speed of the propulsor 18 as needed to produce a desired amount of thrust. In this operating mode, the gas turbine engine 12 drives the electric generator 14 to produce 1 MW, 1.5 MW, 2 MW, or more of electric power which is then supplied through the electric bus 64 to either the electric motor 16 to drive the propulsor 18 or to the battery 66. As another example, the sound signature of the gas turbine propulsion system 10 may be minimized by operating the propulsor 18 with the gas turbine engine 12 secured. The electric bus 64 may supply electric power from the battery 66 to the electric motor 16 to drive the propulsor 18 to produce a desired amount of thrust.

The embodiments previously described and illustrated with respect to FIGS. 2-8 may also provide a method for starting the gas turbine engine 12 without requiring a separate starter motor. For example, the electric bus 64 may supply electric power from the battery 66 or an external source of power to the electric generator 14, causing the electric generator 14 to act as an electric motor. The single spool or shaft 44 then transmits rotation from the generator rotor 48 to the compressor rotor 32 and turbine rotor 38. The combustors 28 may be ignited once the compressor rotor 32 and turbine rotor 38 reach a minimum sustained speed, typically approximately 15% of idle speed. Electric power to the electric generator 14 and fuel flow to the combustors 28 may be gradually increased until the combustors can provide sufficient combustion gases to the turbine 30 to achieve a self-sustaining speed for the gas turbine engine 12, typically approximately 50% of idle speed. At the self-sustaining speed, the single spool or shaft 44 again transmits rotation from the turbine rotor 38 to the generator rotor 48 as the turbine 30 accelerates to the steady state operating speed of approximately 100%. At this speed, the electric generator 14 may be connected to a load or power electronics to produce electric output.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A gas turbine propulsion system, comprising:
a shroud that defines a fluid flow path;
a gas turbine engine entirely in said fluid flow path defined by said shroud, wherein said gas turbine engine comprises a compressor, a combustor downstream from said compressor, and a turbine downstream from said combustor;
an electric generator entirely in said fluid flow path defined by said shroud and upstream from said gas turbine engine, wherein said electric generator comprises a rotor coaxially aligned with said turbine;
a propulsor upstream from said gas turbine engine and entirely in said fluid flow path defined by said shroud; and
an electric motor operably coupled to said propulsor to rotate said propulsor;
wherein said propulsor is rotationally isolated from said gas turbine engine during all operating conditions so that said propulsor rotates independently from operation of said gas turbine engine.

2. The gas turbine propulsion system as in claim 1, wherein said turbine of said gas turbine engine comprises an integrally bladed rotor.

3. The gas turbine propulsion system as in claim 1, wherein said electric motor is coaxially aligned with said electric generator.

4. The gas turbine propulsion system as in claim 1, wherein said propulsor is coaxially aligned with said electric generator.

5. The gas turbine propulsion system as in claim 1, wherein said gas turbine engine is a single-spool gas turbine engine.

6. The gas turbine propulsion system as in claim 1, wherein said gas turbine engine comprises a shaft that rotatably connects said turbine to said rotor of said electric generator so that said turbine and said rotor rotate at the same speed.

7. The gas turbine propulsion system as in claim 6, further comprising a plurality of non-lubricated bearings that rotatably support said shaft, wherein said non-lubricated bearings are not supplied lubrication from a source outside of said shroud.

8. A gas turbine propulsion system, comprising:
a shroud that defines a fluid flow path;
a gas turbine engine entirely in said fluid flow path defined by said shroud, wherein said gas turbine engine comprises a compressor, a combustor downstream from said compressor, and a turbine downstream from said combustor;
an electric generator operably connected upstream from said gas turbine engine, wherein said electric generator comprises a rotor coaxially aligned with said turbine;
a shaft that rotatably connects said turbine to said rotor of said electric generator so that said turbine and said rotor rotate at the same speed;
a propulsor upstream from said electric generator and entirely in said fluid flow path defined by said shroud;
an electric motor operably coupled to said propulsor to rotate said propulsor;
wherein said propulsor is rotationally isolated from said gas turbine engine during all operating conditions so that said propulsor rotates independently from operation of said gas turbine engine.

9. The gas turbine propulsion system as in claim 8, wherein said turbine of said gas turbine engine comprises an integrally bladed rotor.

10. The gas turbine propulsion system as in claim 8, wherein said electric motor is coaxially aligned with said electric generator.

11. The gas turbine propulsion system as in claim 8, wherein said propulsor is coaxially aligned with said electric generator.

12. The gas turbine propulsion system as in claim 8, wherein said gas turbine engine is a single-spool gas turbine engine.

13. The gas turbine propulsion system as in claim 12, further comprising a plurality of non-lubricated bearings that rotatably support said single-spool gas turbine engine, wherein said non-lubricated bearings are not supplied lubrication from a source outside of said gas turbine engine.

14. A gas turbine propulsion system, comprising:
a shroud that defines a fluid flow path;
a gas turbine engine entirely in said fluid flow path defined by said shroud, wherein said gas turbine engine comprises a compressor, a combustor downstream from said compressor, and a turbine downstream from said combustor;
an electric generator operably connected upstream from said gas turbine engine, wherein said electric generator comprises a rotor;
a shaft that rotatably connects said turbine to said rotor of said electric generator so that said turbine and said rotor rotate at the same speed;
a propulsor upstream from said gas turbine engine and entirely in said fluid flow path defined by said shroud; and
an electric motor operably coupled to said propulsor to rotate said propulsor;
wherein said electric motor and said propulsor are rotationally isolated from said gas turbine engine during all operating conditions so that said propulsor rotates independently from operation of said gas turbine engine.

15. The gas turbine propulsion system as in claim 14, wherein said turbine of said gas turbine engine comprises an integrally bladed rotor.

16. The gas turbine propulsion system as in claim 14, wherein said rotor is coaxially aligned with said compressor.

17. The gas turbine propulsion system as in claim 14, wherein said electric motor is coaxially aligned with said electric generator.

18. The gas turbine propulsion system as in claim 14, further comprising a plurality of non-lubricated bearings that rotatably support said shaft, wherein said non-lubricated bearings are not supplied lubrication from a source outside of said shroud.

* * * * *